United States Patent [19]

Plummer et al.

[11] B 4,013,125

[45] Mar. 22, 1977

[54] FLOODING WITH MICELLAR DISPERSIONS CONTAINING PETROLEUM SULFONATES OBTAINED BY SULFONATING WHOLE OR TOPPED CRUDE OIL

[75] Inventors: Mark A. Plummer; Donald E. Schroeder, Jr.; Wayne O. Roszelle, all of Littleton, Colo.

[73] Assignee: Marathon Oil Company, Findlay, Ohio

[22] Filed: Mar. 27, 1975

[21] Appl. No.: 562,519

[44] Published under the second Trial Voluntary Protest Program on March 30, 1976 as document No. B 562,519.

[52] U.S. Cl. ............................ 166/273; 166/274; 166/275; 166/252; 252/8.55 D
[51] Int. Cl.² ........................................ E21B 43/22
[58] Field of Search .......... 166/252, 273, 274, 275, 166/305 R; 252/8.55 D

[56] References Cited
UNITED STATES PATENTS

| | | | |
|---|---|---|---|
| 3,254,714 | 6/1966 | Gogarty et al. | 166/274 |
| 3,275,075 | 9/1966 | Gogarty et al. | 166/274 |
| 3,330,345 | 7/1967 | Henderson et al. | 166/273 |
| 3,477,511 | 11/1969 | Jones et al. | 166/275 X |
| 3,536,136 | 10/1970 | Jones | 166/252 |
| 3,753,465 | 8/1973 | Denekas | 166/252 |
| 3,827,496 | 8/1974 | Schroeder | 166/274 X |

*Primary Examiner*—Stephen J. Novosad
*Assistant Examiner*—George Suckfield
*Attorney, Agent, or Firm*—Joseph C. Herring; Jack L. Hummel

[57] ABSTRACT

Flooding of a subterranean formation with micellar dispersions containing petroleum sulfonates obtained by sulfonating whole or topped crude oil is improved through the use of a micellar dispersion of a predetermined viscosity containing an amount of cosurfactant in excess of that required to cause the micellar dispersion to have the highest viscosity possible for the particular micellar dispersion with the particular cosurfactant used. Preferably, the cosurfactant is an alcohol and the cosurfactant concentration is sufficiently high to control the micellar dispersion to have a predetermined mobility when injected into a hydrocarbon-bearing formation.

14 Claims, 3 Drawing Figures

"VISCOSITY vs COSURFACTANT ADDITION FOR MICELLAR DISPERSION USED IN EXAMPLE II."

Fig. 1 "VISCOSITY vs COSURFACTANT ADDITION FOR MICELLAR DISPERSION USED IN EXAMPLE II."

Fig. 2 "VISCOSITY vs COSURFACTANT ADDITION FOR MICELLAR DISPERSION USED IN EXAMPLE III."

— 1 —

FLOODING WITH MICELLAR DISPERSIONS CONTAINING PETROLEUM SULFONATES OBTAINED BY SULFONATING WHOLE OR TOPPED CRUDE OIL

BACKGROUND OF THE INVENTION

1. Field of the Invention

This invention relates to injecting a micellar dispersion into a subterranean formation and displacing it toward a production means in fluid communication with the formation to recover crude oil therethrough.

2. Description of the Prior Art

The prior art recognizes that micellar dispersions are useful to displace crude oil from subterranean formations, examples of U.S. Pat. Nos. include 3,254,714; 3,275,075; 3,506,070; 3,497,006, 3,613,786; 3,734,185; 3,740,343; 3,827,496; and other patents defining surfactant systems and assigned to Esso Production and Research, Shell Oil Company, Union Oil Company, etc. The micellar dispersion can be water-external or oil-external. The prior art generally teaches that the injected micellar dispersion is followed by an aqueous mobility buffer and this in turn followed by a water drive. In general, the above patents teach that the surfactant useful in the micellar dispersion is a petroleum sulfonate obtained from gas oils or other fractions of crude oil. Much of the prior art relating to sulfonation to produce petroleum sulfonates describes processes wherein the petroleum sulfonate produced is a by-product of the polishing of lubricating stock. Different processes are needed to produce the different types of petroleum sulfonates needed for widespread effective and economic oil recovery. Processes such as those in copending U.S. patent Ser. Nos. 513,692 and 376,657 teach processes wherein whole or topped crude oil are sulfonated to obtain sulfonates useful in crude oil recovery. The micellar dispersions using these new types of petroleum sulfonates contain cosurfactants. In the processes of our applications, whole or topped crude is sulfonated with sulfur trioxide and the sulfonic acids neutralized with a monovalent base to obtain the desired sulfonate, and unreacted hydrocarbon can be removed either before or after neutralization.

SUMMARY OF THE INVENTION

The petroleum sulfonates made from whole or topped crude are formulated into micellar dispersions which contain cosurfactants in excess of the amount required to provide a maximum viscosity for the micellar dispersion. Micellar dispersions on the "right side" of the maximum viscosity peak obtain improved oil recoveries as compared to dispersions on the "left side" of the peak.

PREFERRED EMBODIMENTS OF THE INVENTION

Figure 1:
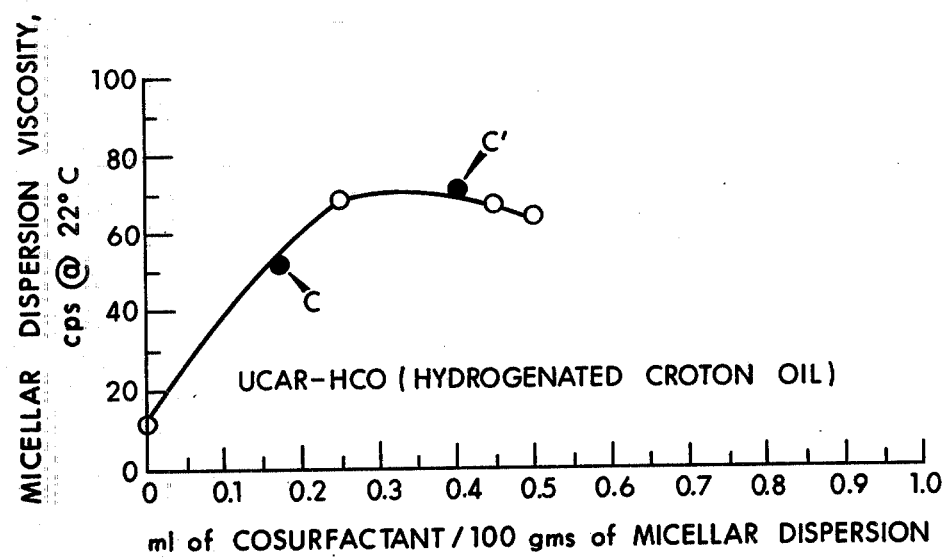
FIG. 1 represents the micellar dispersions used in Example II. The viscosity of the micellar dispersion in cp at 22°C. is plotted vs. the titration of that micellar dispersion with hydrogenated croton oil (marketed by Union Carbide Co., N.Y., N.Y. under their designation UCAR-HCO) in ml per 100 gms of the cosurfactant-free micellar dispersion.

The term "micellar dispersion" as used herein is meant to include microemulsions and micellar systems containing lamellar micelles. These systems can be oil-external or water-external, they can act like they are either oil-external or water-external and they can also be in an "intermediate" region between a "classically" oil-external micellar system and a "classically" water-external micellar system. However, all of the systems, regardless of the externality properties, are thermodynamically stable and optically clear; however, color bodies within the component(s) can prevent the transmission of light. For simplicity, the micellar systems are herein defined as micellar dispersions.

The micellar dispersions are composed of hydrocarbon, water, petroleum sulfonates, cosurfactant, and electrolyte. Additional components can be added if desirable. However, these components must be compatible with the other components of the micellar dispersion and not impart adverse properties to the system.

Examples of the components useful with the micellar dispersion are defined in the prior art; for example, those components taught in the above-indicated patent numbers of the "prior art". The petroleum sulfonate is obtained by sulfonating whole or topped crude oil with preferably sulfur trioxide and thereafter neutralizing the sulfonic acids with a monovalent cation, preferably sodium or ammonium. The petroleum sulfonic acids can be extracted before neutralization or the sulfonate can be extracted after neutralization to remove component(s). Diluents can be used during the sulfonation process to enhance reaction conditions. Also, components can be added to the sulfonation process to obtain enhanced oil recovery or to give improved processing conditions. Examples of processes to obtain the petroleum sulfonates are taught in U.S. Ser. No. 430,963 (docket No. 730064-A), titled Sulfonation of Crude Oils with Gaseous $SO_3$ to Produce Petroleum Sulfonates, filed Jan. 4, 1974, and Ser. No. 513,672 (docket No. 710120-B), titled Sulfonation of Crude Oils to Produce Petroleum Sulfonates, filed Oct. 10, 1974. Process technology within the prior art is intended to be included within the scope of this invention to obtain the petroleum sulfonates.

The hydrocarbon is typically crude oil, a fraction thereof, unreacted vehicle oil within the petroleum sulfonate, synthesized hydrocarbon or a mixture thereof.

The water can be distilled water, fresh water, or water containing a moderate amount of salts. Typically, the water contains about 5 to about 50,000 TDS (total dissolved solids). Preferably, the water does not contain multivalent cations which will displace the monovalent cations on the petroleum sulfonate molecules.

The electrolytes are water-soluble and can be inorganic salts, inorganic bases, or inorganic acids. Typically, the salts are reaction by-products from the sulfonation reaction, e.g. sodium sulfate, ammonium sulfate. The cosurfactant is also known as a semi-organic polar organic compound, a cosolubilizer, etc. Examples of useful cosurfactants include organic compounds containing 1 to about 25 or more carbon atoms and preferably 3 to about 16 carbon atoms, which can be an alcohol, amide, amino compound, ester, aldehyde, ketone, complex of two or more of these compounds, or a compound containing one or more of amido, hydroxy, bromo, chloro, carbonato, mercapto, oxo, oxy, carbonyl, or like groups or mixtures thereof. Specific examples include isopropanol, butanol, amyl alcohols, hexanols, octanols, decylalcohols, alkaryl alcohols, such as n-nonylphenol and p-nonylphenol, 2-butoxyhexanol, alcoholic liquors such as fusel oil, ethoxylated alcohols such as alcohols containing 4 to 16 carbon atoms that are ethoxylated and optionally sulfated, hydrogenated hydrocarbons such as croton oil and like materials. The preferred cosurfactant is an alcohol and it can be a primary, secondary or tertiary alcohol or mixture thereof and can optionally be ethoxylated and/or sulfated.

Concentration of the components within the micellar dispersion vary depending upon the particular component and the particular properties desired of the micellar dispersion. Typically the concentrations can be about 1 to about 90% and preferably about 2 to about 40% and more preferably about 4 to about 20 and most preferably about 5 to about 15% of hydrocarbon, 10 to about 95% and preferably about 50 to about 85% and more preferably about 60 to about 80% of water; about 1.5 to about 4.5 and preferably about 1.75 to about 4.25 and more preferably about 2 to about 4% and most preferably about 2.5 to about 3.5% of active sulfonate groups, e.g. $-SO_3NH_4$, from the petroleum sulfonate molecule, about 0.01 to about 20% and preferably about 0.1 to about 7.5% and more preferably about 0.2 to about 5% of the cosurfactant, and about 0.001 to about 10%, and preferably about 0.5 to about 5% of electrolyte, the above percents based on weight.

The micellar dispersion can be injected into the formation in volume amounts of less than 1 to about 50% or more and preferably about 4 to about 15% FPV (formation pore volume). This is preferably followed by a mobility buffer, preferably an aqueous solution containing a water-soluble polymer that will impart permeability reduction to the formation rock and/or viscosity increasing properties to the aqueous solution—examples of volume amounts include about 10% to 200% or more FPV and preferably about 50 to about 150% and more preferably about 70% to about 100% FPV. A water drive is injected to displace the micellar dispersion and the mobility buffer toward a production well in fluid communication with the formation to recover crude oil through the production well. The water drive should be compatible with the other components of the process as well as the subterranean formation.

To obtain desired cosurfactant concentration, other constituents of the micellar dispersions are titrated with a cosurfactant to go through a viscosity maximum. That is, upon titration, the viscosity increases until it hits a maximum and thereafter decreases. The micellar dispersions used in the process of this invention are those that are decreasing in viscosity on increasing the concentration of cosurfactant or on the "right side" of the viscosity maximum. After the micellar dispersion goes through the viscosity maximum, the cosurfactant titration is continued until the desired viscosity is obtained to establish a mobility desired for the particular formation to be flooded. The desired viscosity will depend upon the combined mobility of the hydrocarbon and water within the formation to be flooded, the design mobility of the mobility buffer, and in general, the overall "life" of the flooding project, design mobility and desired "pay-out" and economics of the flooding project. For a given micellar dispersion, titration of the dispersion to a given viscosity on the left side of the viscosity maximum will obtain less oil recovery than an identical viscosity on the right side. That is, optimum oil recovery is obtained with cosurfactant additions greater than that yielding the maximum micellar dispersion viscosity.

Generally speaking, the viscosity of the micellar dispersion at reservoir temperature is desirably greater than the combined reciprocal mobility of formation fluids, i.e. hydrocarbon, gas, and water within the formation.

Working Examples:

The following examples are presented to teach specific embodiments of the invention. The water used to condition the core samples for tertiary condition contains 8000 ppm of TDS. Unless otherwise specified, all percents are based on weight.

EXAMPLE I

Berea sandstone cores 4 ft. long and 3 inches in diameter are processed into a tertiary condition by first saturating the core with water, then flooding with oil to irreducible water saturation and thereafter flooding with water to irreducible oil saturation. Four core samples are flooded with two micellar dispersions. Each of the two micellar dispersions have the same concentration of components therein except in each case the micellar dispersion is titrated with the indicated cosurfactant such that one micellar dispersion is on the left side of the viscosity maximum and the other micellar dispersion is on the right side of the viscosity maximum. 1.0% FPV (formation pore volume) of the micellar dispersions are injected into the core samples and these followed by 100% FPV of a mobility buffer containing 1,000 ppm of Dow Pusher Polymer 700 (a partially hydrolyzed, high molecular weight polyacrylamide marketed under the trademark Pusher by Dow Chemical Company, Midland, Michigan) and water which contains 400 ppm. of TDS (40 ppm of the 400 ppm is calcium cation). Thereafter, sufficient water drive, containing 8000 ppm of TDS, is injected to displace the mobility buffers through the core samples. The indicated oil recovery is based on the oil in place. Compositions of the micellar dispersions are as follows:

Micellar Dispersion A (Run 75312):
1. Ammonium Sulfonate groups from the petroleum sulfonate = 4 wt. % $-SO_3NH_4$.
2. Water = 70%
3. Hydrocarbon = 9.4% which is composed of unreacted crude oil.
4. Electrolyte = 5.0%
5. Cosurfactant = hexanol added in ml per 100 gms of the micellar dispersion:
   a. Micellar Dispersion A: (on "left side" of viscosity maximum = 0.
   b. Micellar Dispersion A' (on the "right side" of the viscosity maximum) = 1.0

Micellar Dispersion B (Run 75313):
1. Same as above except dispersion B (on the "left side" of the viscosity maximum) contains 0.4 ml of hexanol/100 gms of the dispersion and dispersion B' (on the "right side") contains 1.4 ml The results of the floods are in Table I:

TABLE 1

| Micellar Dispersion | Core Permeability (md) | Ml of hexanol/100 gms of micellar dispersion | % Oil Recovery |
|---|---|---|---|
| A (left side of viscosity maximum) | 784 | 0.0 | 32 |
| A' (right side of viscosity maximum) | 579 | 1.0 | 40 |
| B (left side of viscosity maximum) | 487 | 0.4 | 35 |
| B' (right side of viscosity maximum) | 497 | 1.4 | 42 |

From the above data, it is readily apparent that dispersions A' and B' obtain better oil recovery than A and B.

EXAMPLE II (Core floods Nos. 017311, 017312, 027301, and 027302). Berea sandstone cores similar to those in Example I are treated the same as those in Example I. Permeabilities of the cores are indicated in Table II. Micellar dispersions, identified in Table II, are used to flood the cores. 8.4% FPV of the dispersions are injected into the cores followed by 10% FPV of water containing 1000 ppm of a copolymer of sodium acrylate and acrylamide having an IV (intrinsic viscosity) of 21 and this, in turn, followed by 54% FPV of water containing 404 ppm of copolymer of sodium acrylate and acrylamide having an IV of 21, and this, in turn, followed by 30% FPV of water containing 50 ppm of a copolymer of sodium acrylate and acrylamide having an IV of 21. IV, as used herein, is defined as intrinsic viscosity measured in 2 normal sodium chloride solution at 25°C. Thereafter, sufficient drive water is injected to displace the micellar dispersion and mobility buffer through the cores. The percent oil recoveries are indicated in Table 2 and are corrected to 40% of initial tertiary oil saturation in the core—that is, the oil recovery obtainable had the tertiary oil saturation been 40%. Duplicate runs are made with micellar dispersion C and C'. Micellar dispersion C (on "left side" of viscosity maximum) and C' (on "right side" of viscosity maximum) are illustrated in FIG. 1 of the attached drawings.

TABLE 2

| Designation | Micellar Dispersion Composition | | | Micellar Dispersion Viscosity cp at 72°F. | Oil Recovery Data | | | | |
|---|---|---|---|---|---|---|---|---|---|
| | Wt. % —SO₃NH₄/salt/water | | | | Rate ft/day | K md | Soi % | Rec % | Rec at 40% Soi |
| | | | Cosurfactant ml/100 gms | | | | | | |
| C' | 2.5 | 2.4 | 79.3 | 0.40 | 71.3 | 0.24 | 291 | 28.9 | 78.2 | 84.2 |
| C' | 2.5 | 2.4 | 79.3 | 0.40 | 71.3 | 0.25 | 310 | 29.8 | 75.0 | 81.4 |
| C | 2.5 | 2.4 | 79.3 | 0.17 | 41.5 | 0.26 | 129 | 31.7 | 31.5 | 45.7 |
| C | 2.5 | 2.4 | 79.3 | 0.17 | 41.5 | 0.27 | 128 | 33.8 | 41.9 | 50.9 |

The cosurfactant is a hydrogenated croton oil identified as UCAR-HCO obtained from Union Carbide, New York, New York. K is permeability. Soi is initial oil saturation within the core.

These data again illustrate that the micellar dispersion on the left side of the maximum viscosity peak obtains less oil recovery than a similar micellar dispersion on the right side of the peak.

EXAMPLE III

Figure 2:
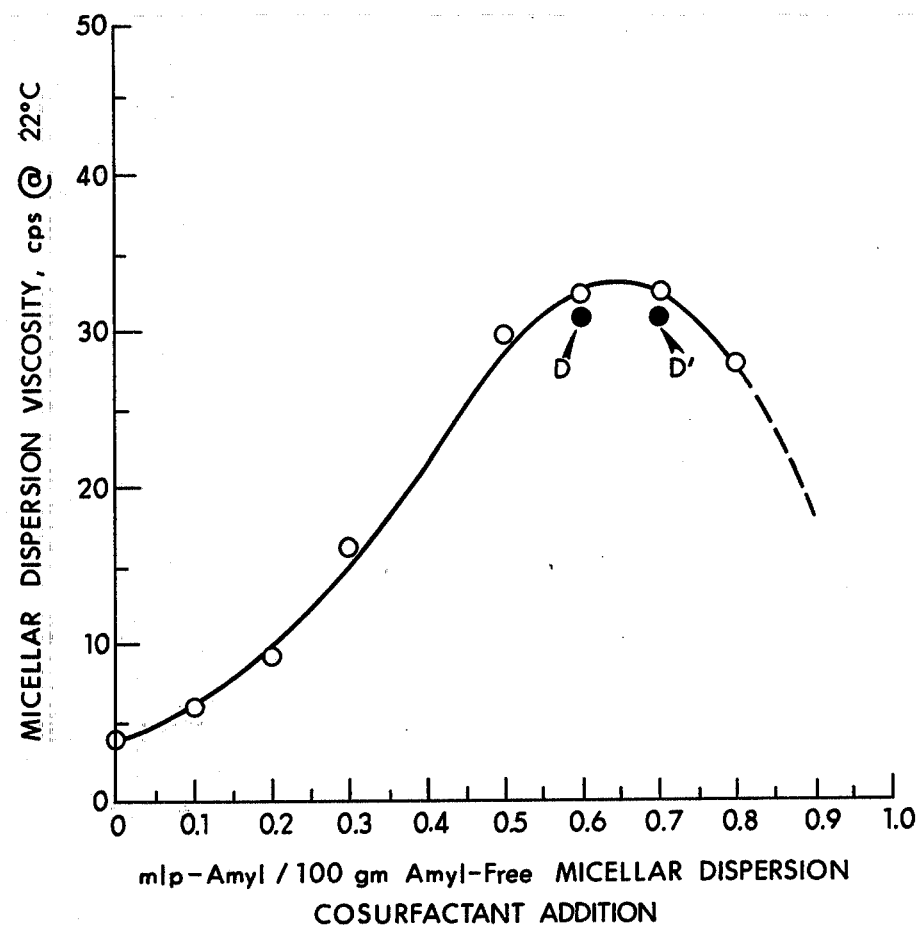
FIG. 2 represents the relationship of viscosity vs. the alcohol titration of the micellar dispersion used in Example III. In this curve, the micellar dispersion is titrated with p-amyl alcohol.

Core discs 6 inches in diameter and 2 inches thick taken from the Henry reservoir in Illinois are prepared for a tertiary condition by first flushing the core disc with a solvent, then drying the disc in a vacuum at 50°C. and then saturating the disc with water, then flooding the disc with oil having a viscosity of 7 cp at 22°C. until irreducible water saturation and thereafter flooding the disc with water until irreducible oil saturation. The cores are now in a tertiary condition. The cores are flooded with 12.5% FPV of micellar dispersions D (ECOSS-22) and D' (ECOSS-25). The compositions of the dispersions are defined in Table 3 and the viscosity properties are illustrated in FIG. 2. The micellar dispersions are followed with 137.5% FPV of water containing 1,000 ppm of Dow Pusher 700 Polymer. Thereafter, sufficient drive water is injected to displace the micellar dispersion and mobility buffer through the discs.

TABLE 3

| MICELLAR DISPERSION COMPOSITION | | | | |
|---|---|---|---|---|
| Designation | —SO₃NH₄ | Salt | Water | Cosurfactant (ml of p-amyl alcohol/100 gms of Micellar Dispersion) |
| D | 2.0 | 2.03 | 84.5 | 0.6 |
| D' | 2.0 | 2.03 | 84.5 | 0.7 |

Viscosities of both the micellar dispersions are identical, i.e. 31 cp at 22°C. Oil recoveries obtained with the micellar dispersions are illustrated in Table 4:

TABLE 4

| Micellar Dispersion | Core Properties | | | % Oil Recovery | |
|---|---|---|---|---|---|
| | K(md) | Porosity | Soi | Actual | Soi of 40% |
| D | 120 | .214 | .355 | 47 | 53 |
| D' | 112 | .219 | .375 | 58 | 64 |

From the above data, it is evident that again, the micellar dispersions on the right side of the viscosity peak recover more oil than a similar micellar dispersion on the left side of the viscosity peak even through they have identical viscosities.

EXAMPLE IV

Figure 3:
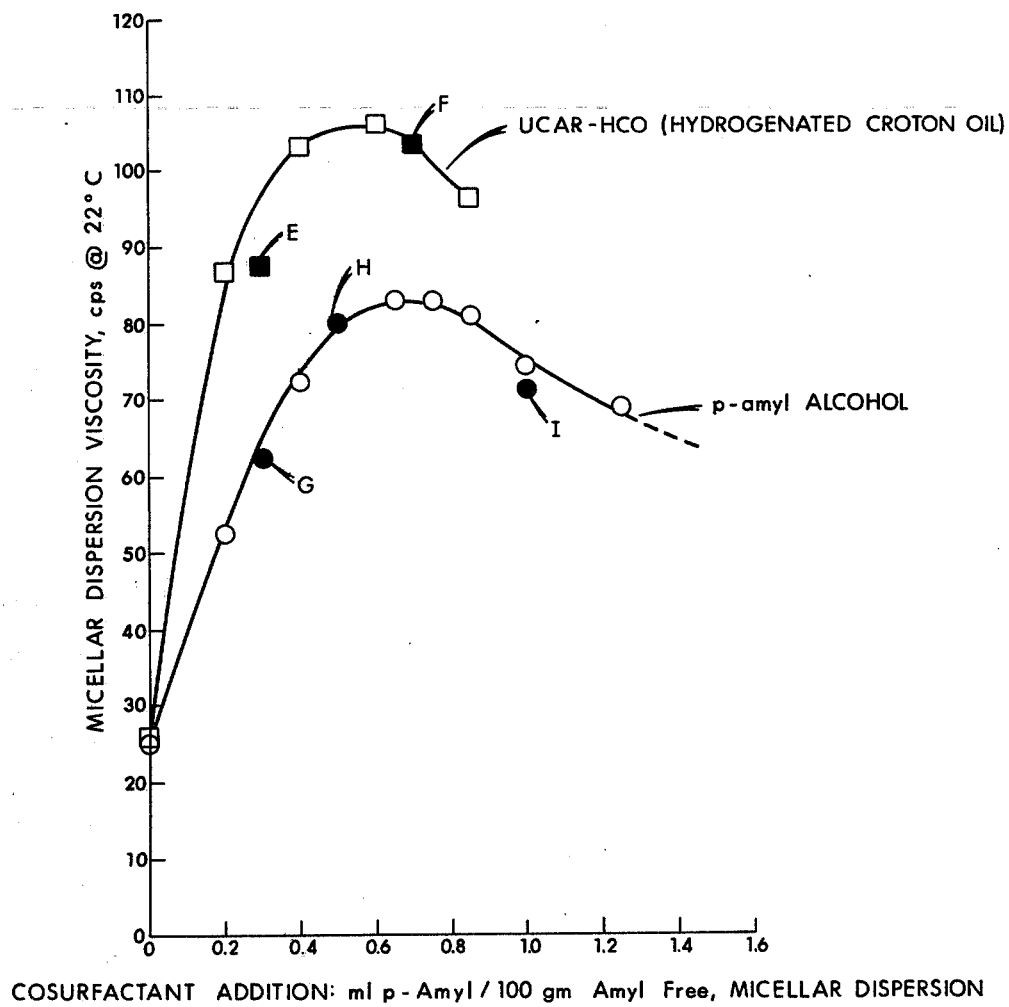
FIG. 3 represents the five micellar dispersions used in Example IV. The viscosity of the micellar dispersions in cp at 22°C. is plotted vs. the cosurfactant addition in ml/100 gms of the cosurfactant-free micellar dispersion.

Disc cores identical to those in Example III, except having the properties indicated in Table 5 are flooded with micellar dispersions E thorugh I. The dispersions, on an alcohol-free basis, contain 3.41% of —SO₃NH₄ groups (this is equivalent to 14.53% active ammonium petroleum sulfonate, the sulfonate has an average equivalent weight of 418), 3.76% of ammonium sulfate, 72.1% water and 9.6% of vehicle oil (unreacted hydrocarbon within the petroleum sulfonate). The cores are flooded with 7% FPV of the micellar dispersions followed by 10% FPV of water containing 1100 ppm of Dow Pusher 700 polymer and this in turn followed by 53% FPV of water containing 615 ppm of Dow Pusher 700 Polymer and this, in turn, followed by 30% FPV of water containing 117 ppm of Dow Pusher 700 polymer and this, in turn, followed by 50% FPV of water containing 8000 ppm. of TDS. The viscosity curve of the micellar dispersions plotted against the cosurfactant addition is illustrated in FIG. 3. Micellar dispersions E and F are titrated with hydrogenated croton oil (UCAR-HCO) and dispersions G, H, and I are titrated with p-amyl alcohol. The recovery data as well as the properties of the cores are illustrated in Table 5:

TABLE 5

| Micellar Dispersion | Flooding Rate ft/day | Core Properties K(md) | Porosity | % Oil Recovery | | |
|---|---|---|---|---|---|---|
| | | | | Soi | Actual | Corrected to Soi of 40% |
| E | 0.292 | 73 | 0.206 | 0.443 | 51.6 | 46.4 |
| F | 0.292 | 133 | 0.225 | 0.417 | 70.5 | 69.3 |
| G | 0.296 | 211 | 0.226 | 0.404 | 54.3 | 53.8 |
| H | 0.289 | 101 | 0.211 | 0.417 | 59.2 | 57.5 |
| I | 0.277 | 134 | 0.223 | 0.356 | 65.4 | 69.2 |

These data again substantiate the fact that the micellar dispersions on the right side of the viscosity maximum obtain improved oil recovery.

It is not intended that the above examples limit the invention. Rather, it is intended that all equivalents obvious to those skilled in the art be incorporated within the scope of the invention as defined within the specification and appended claims.

What is claimed is:

1. In a process of recovering hydrocarbon from a subterranean formation having at least one injection means in fluid communication with at least one production means and wherein a micellar dispersion comprised of water, hydrocarbon, cosurfactant, electrolyte and petroleum sulfonate obtained by sulfonating whole or topped crude oil is injected into the formation and displaced toward the production means to recover hydrocarbon therethrough, the improvement comprising incorporating amounts of the cosurfactant into the micellar dispersion in excess of the amounts required to cause the micellar dispersion to go through a maximum viscosity and to establish a desired viscosity for the flooding of the subterranean formation, and then injecting the micellar dispersion into the formation.

2. The process of claim 1 wherein the micellar dispersion is followed by a mobility buffer.

3. The process of claim 2 wherein a water drive is injected to displace the micellar dispersion and mobility buffer toward the production means.

4. The process of claim 1 wherein the micellar dispersion contains about 1.5 to about 4.5% of active sulfonate groups, about 1 to about 90% hydrocarbon, about 10 to about 95% water, about 0.001 to about 10% electrolyte, about 0.01 to about 20% cosurfactant, all percents based on weight.

5. The process of claim 4 wherein the active sulfonate groups are —SO$_3$NH$_4$.

6. The process of claim 4 wherein the active sulfonate groups are —SO$_3$Na.

7. The process of claim 1 wherein the micellar dispersion is comprised of about 50 to about 85% water, about 2 to about 40% hydrocarbon, about 1.75 to about 4.25 of —SO$_3$NH$_4$ groups from the petroleum sulfonate, about 0.1 to about 7.5% of a cosurfactant, and about 0.5 to about 5% of electrolyte, the percents based on weight.

8. The process of claim 7 wherein the micellar dispersion contains about 2 to about 4% of —SO$_3$NH$_4$ groups.

9. The process of claim 7 wherein the micellar dispersion contains about 5 to about 15% hydrocarbon.

10. The process of claim 1 wherein the micellar dispersion has a viscosity of at least about 25 cp at 22°C.

11. In a process of recovering hydrocarbon from a subterranean reservoir having at least one injection means in fluid communication with at least one production means and wherein a micellar dispersion comprised of about 60 to about 85% water, about 2 to about 15% hydrocarbon, and about 2 to about 4% of —SO$_3$NH$_4$ groups from a petroleum sulfonate obtained by sulfonating whole or topped crude oil and about 0.1 to about 7.5% of a cosurfactant and about 0.5 to about 5% by weight of an electrolyte is injected into the formation, followed by an aqueous mobility buffer and then sufficient drive water to displace the dispersion toward the production means to recover hydrocarbon therethrough, the improvement comprising incorporating amounts of the cosurfactant in excess of those amounts required to produce in the micellar dispersion a maximum viscosity and thereafter increasing the amount of the cosurfactant to establish a micellar dispersion of desired viscosity and then injecting the micellar dispersion into the formation.

12. The process of claim 11 wherein the mobility buffer is an aqueous solution containing a high molecular weight polymer that reduces the permeability of the formation with respect to the aqueous mobility buffer and also imparts increased viscosity to the buffer.

13. The process of claim 11 wherein the micellar dispersion contains about 2.5 to about 3.5% of —SO$_3$NH$_4$ groups.

14. In a process of recovering hydrocarbon from a subterranean reservoir having at least one injection means in fluid communication with at least one production means and wherein a micellar dispersion comprising about 60 to about 80% water, about 4 to about 15% hydrocarbon, and about 2.5 to about 3.5% of —SO$_3$NH$_4$ groups from a petroleum sulfonate obtained by sulfonating whole or topped crude oil and about 0.1 to about 7.5% of a cosurfactant and about 0.5 to about 5% by weight of an electrolyte is injected into the formation, followed by an aqueous mobility buffer and then sufficient drive water to displace the dispersion toward the production means to recover hydrocarbon therethrough, the improvement comprising incorporating amounts of the cosurfactant in excess of those amounts required to produce in the micellar dispersion a maximum viscosity and thereafter increasing the amount of the cosurfactant to establish a micellar dispersion of desired viscosity and then injecting the micellar dispersion into the formation and displacing it toward the production means to recover hydrocarbon therethrough.

* * * * *